United States Patent  
Singh et al.

(10) Patent No.: US 9,485,107 B2  
(45) Date of Patent: Nov. 1, 2016

(54) SYSTEM AND METHOD FOR DISTRIBUTED INTERNET GROUP MANAGEMENT PROTOCOL PROCESSING

(75) Inventors: Bijendra Singh, Plano, TX (US); Albert Vinson Smith, Jr., Richardson, TX (US); Calvin Wan, Plano, TX (US); Abirami Sathyamoorthy, Frisco, TX (US)

(73) Assignee: Fujitsu Limited, Kawasaki (JP)

( * ) Notice: Subject to any disclaimer, the term of this patent is extended or adjusted under 35 U.S.C. 154(b) by 647 days.

(21) Appl. No.: 13/301,336

(22) Filed: Nov. 21, 2011

(65) Prior Publication Data

US 2013/0128774 A1  May 23, 2013

(51) Int. Cl.  
*H04L 12/18* (2006.01)

(52) U.S. Cl.  
CPC .................................. *H04L 12/185* (2013.01)

(58) Field of Classification Search  
CPC ..... H04L 12/185; H04L 12/18; H04L 12/56; H04L 12/28; H04L 45/00; H04L 45/16; H04W 4/06  
See application file for complete search history.

(56) References Cited

U.S. PATENT DOCUMENTS

| | | | |
|---|---|---|---|
| 6,484,209 B1 | 11/2002 | Momirov | 709/238 |
| 6,804,236 B1 | 10/2004 | Mahajan et al. | 370/390 |
| 6,967,949 B2 | 11/2005 | Davis et al. | 370/390 |
| 7,385,977 B2 | 6/2008 | Wu et al. | 370/389 |
| 7,443,852 B2 | 10/2008 | Kwon et al. | 370/390 |
| 7,486,612 B2 | 2/2009 | Wong et al. | 370/221 |
| 7,545,735 B1 | 6/2009 | Shabtay et al. | 370/217 |
| 7,590,749 B2 | 9/2009 | Lu et al. | 709/230 |
| 7,664,053 B2 | 2/2010 | Chen et al. | 370/254 |
| 7,746,799 B2 | 6/2010 | Kokot et al. | 370/252 |
| 7,856,019 B2 | 12/2010 | Shah et al. | 370/390 |
| 7,974,192 B2 | 7/2011 | Ding | 370/230 |
| 2002/0046271 A1* | 4/2002 | Huang | 709/223 |
| 2004/0090970 A1* | 5/2004 | Sanchez et al. | 370/397 |
| 2005/0007969 A1* | 1/2005 | Hundscheidt et al. | 370/312 |
| 2005/0027801 A1* | 2/2005 | Kashyap et al. | 709/204 |
| 2006/0045085 A1* | 3/2006 | He | 370/390 |
| 2006/0126626 A1 | 6/2006 | Wong et al. | 370/390 |
| 2006/0140206 A1 | 6/2006 | Kataria et al. | 370/419 |
| 2006/0146857 A1* | 7/2006 | Naik et al. | 370/432 |
| 2007/0121627 A1* | 5/2007 | Chen | 370/390 |
| 2007/0195772 A1 | 8/2007 | Shadish | 370/390 |
| 2007/0274310 A1* | 11/2007 | Wei et al. | 370/390 |
| 2008/0068990 A1* | 3/2008 | Wu | 370/229 |
| 2008/0123648 A1 | 5/2008 | Ooghe et al. | 370/390 |

(Continued)

*Primary Examiner* — Ian N Moore  
*Assistant Examiner* — Brian T Le  
(74) *Attorney, Agent, or Firm* — Baker Botts L.L.P.

(57) ABSTRACT

A method may include receiving, at a network interface of a first network element, an Internet Group Management Protocol (IGMP) message from a second network element. The method may also include updating first multicast group data associated with the network interface based on the received IGMP message, the first multicast group data including one or more entries setting forth a multicast group and one or more other network elements which are members of the multicast group. The method may additionally include determining whether the second network element is the sole member of its multicast group based on the IGMP message and the first multicast group data. The method may further include forwarding the IGMP message to a switching element of the first network element in response to determining that the second network element is the sole member of its multicast group, the switching element communicatively coupled to the network interface.

14 Claims, 2 Drawing Sheets

(56) References Cited

U.S. PATENT DOCUMENTS

| | | | |
|---|---|---|---|
| 2009/0073912 A1 | 3/2009 | Bauchot et al. | 370/312 |
| 2009/0213855 A1 | 8/2009 | Xu | 370/390 |
| 2010/0246580 A1 | 9/2010 | Kaganoi et al. | 370/390 |
| 2011/0211577 A1 | 9/2011 | Fu | 370/390 |
| 2011/0277008 A1* | 11/2011 | Smith | 725/116 |

* cited by examiner

SYSTEM AND METHOD FOR DISTRIBUTED INTERNET GROUP MANAGEMENT PROTOCOL PROCESSING

TECHNICAL FIELD OF THE INVENTION

The present invention relates generally to networking and computing systems and, more particularly, to a method and system for distributed Internet Management Group Protocol (IGMP) processing.

BACKGROUND

Telecommunications systems, cable televisions systems, and data communication networks use communication networks to rapidly convey large amounts of information between remote points. A communication network may include network elements that route packets through the network. Some network elements may include a distributed architecture, wherein packet processing may be distributed among several subsystems of the network element (e.g., line cards).

Internet Group Management Protocol (IGMP) is a communications protocol used by hosts and adjacent routers on Internet Protocol (IP) networks to establish multicast group memberships. However, IGMP is a highly computational protocol. For example, using traditional approaches, IGMP may require: a very large number of timers in order to maintain protocol state, generation of IGMP Group query for every multicast group, generation of IGMP General query for every Virtual Local Area Network (VLAN)/Level 2 Bridging Domain, processing of responses from active receivers, processing of IGMP Leave messages, and periodic aging out of groups with no receivers. For a systems with large numbers of multicast groups, the processing required by the IGMP protocol can easily overwhelm a system processor.

SUMMARY

In accordance with the present invention, disadvantages and problems associated with IGMP processing may be reduced or eliminated.

In accordance with embodiments of the present disclosure, a method may include receiving, at a network interface of a first network element, an Internet Group Management Protocol (IGMP) message from a second network element communicatively coupled to the network interface. The method may also include updating first multicast group data associated with the network interface based on the received IGMP message, the first multicast group data including one or more entries, each entry setting forth a multicast group and one or more other network elements which are members of the multicast group and communicatively coupled to the network interface. The method may additionally include determining whether the second network element is the sole member of its multicast group based on the received IGMP message and the first multicast group data. The method may further include forwarding the received IGMP message to a switching element of the first network element in response to determining that the second network element is the sole member of its multicast group, the switching element communicatively coupled to the network interface.

One or more other technical advantages of the present disclosure may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
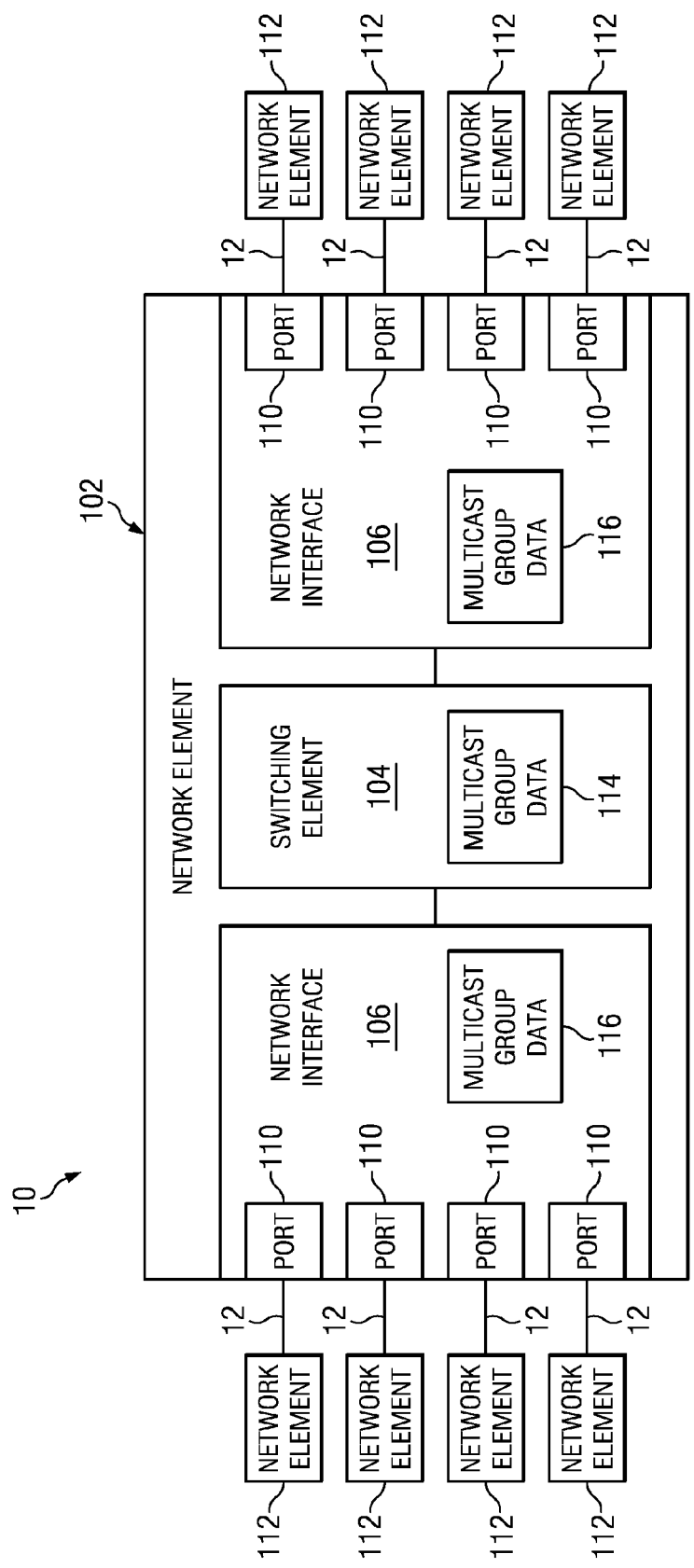
FIG. 1 illustrates a block diagram of an example network, in accordance with embodiments of the present disclosure.
Figure 2:
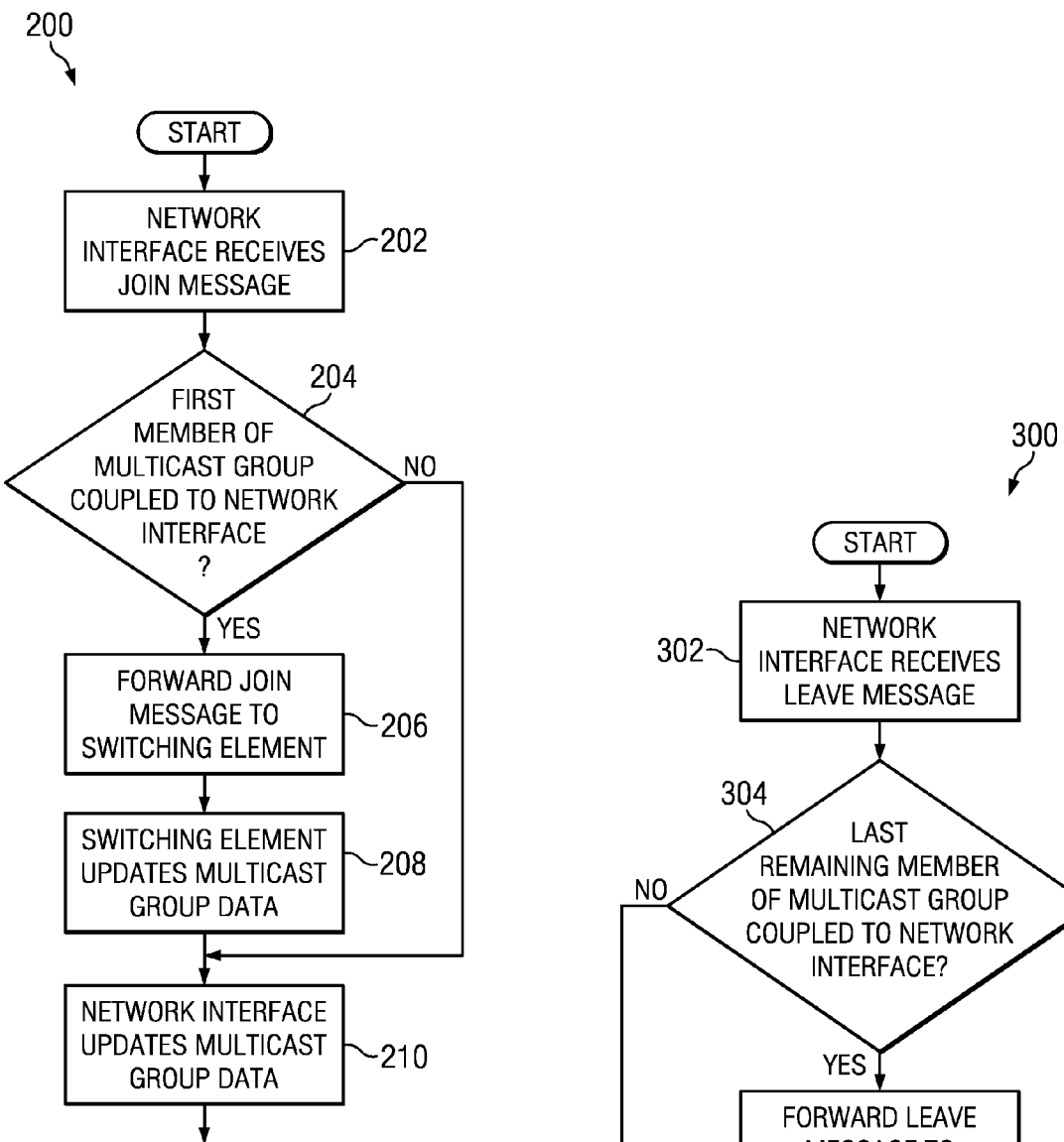
FIG. 2 illustrates a flow chart of an example method for processing of a Join message, in accordance with the present disclosure.
Figure 3:
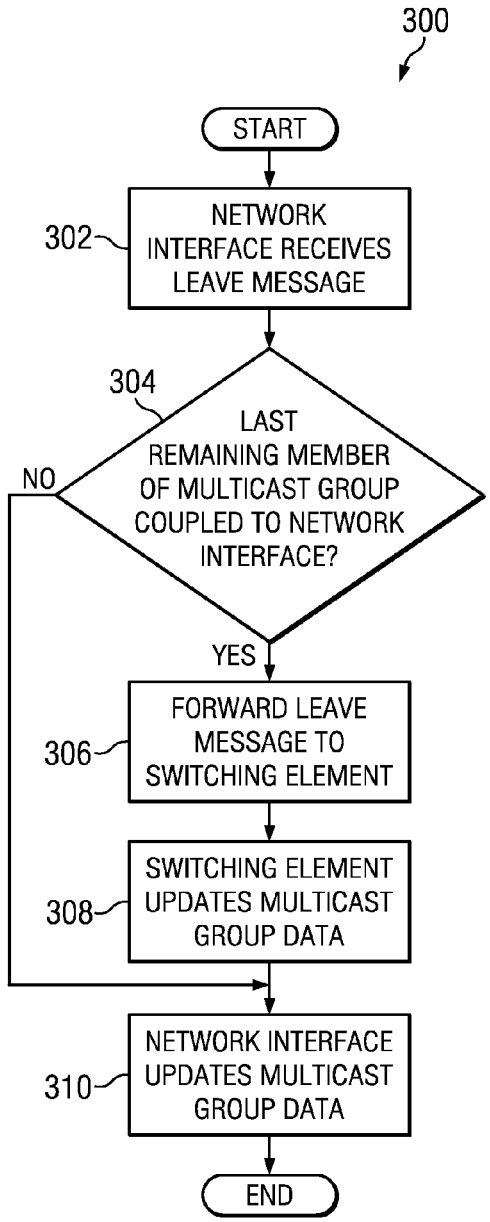
FIG. 3 illustrates a flow chart of an example method for processing of a Leave message, in accordance with the present disclosure.

Embodiments of the present invention and its advantages are best understood by referring to FIGS. 1-3, like numerals being used for like and corresponding parts of the various drawings.

FIG. 1 illustrates a block diagram of an example network 10, in accordance with certain embodiments of the present disclosure. In certain embodiments, network 10 may be an Ethernet network. In these and other embodiments, network 10 may be an optical network. Network 10 may include one or more transmission media 12 operable to transport one or more signals communicated by components of network 10. The components of network 10, coupled together by transmission media 12, may include a plurality of network elements 102, and 112. In the illustrated network 10, network elements 102, 112 may be coupled in a point-to-point manner. However, any suitable configuration of any suitable number of network elements 102, 112 may create network 10. Although network 10 is shown as a point-to-point network, network 10 may also be configured as a ring network, a mesh network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network elements 102, 112 to each other and communicate information between corresponding network elements 102, 112. For example, a transmission medium 12 may include an optical fiber, an Ethernet cable, a T1 cable, copper cable, SONET cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard, Internet Protocol (IP), Internet Group Management Protocol (IGMP), and/or others. Additionally, the traffic communicated in network 10 may be structured in any appropriate manner including, but not limited to, being structured in frames, packets, or an unstructured bit stream. As used herein, the term "datagram" will be used to generally referred to any data structure used to convey traffic, including without limitation a packet, a frame, an unstructured bit stream, or any other suitable data structure.

Each network element 102, 112 in network 10 may comprise any suitable system operable to transmit and receive traffic. In the illustrated embodiment, each network element 102, 112 may be operable to transmit traffic directly to one or more other network elements 102, 112 and receive traffic directly from the one or more other network elements 102, 112. As shown in FIG. 1, network elements may include a central network element 102 and client network elements 112. Central network element 102 may be configured to perform maintenance and processing for one or more IGMP groups, while client network elements 112 may comprise members of one or more IGMP groups configured to send or receive multicast data within network 10 (e.g., IGMP receivers).

As depicted in FIG. 1, network element 102 may include a switching element 104 and one or more network interfaces 106 communicatively coupled to switching element 104.

Switching element 104 may include any suitable system, apparatus, or device configured to receive traffic via a port 110 and forward such traffic to a particular network interface 106 and/or port 110 based on analyzing the contents of the datagrams carrying the traffic and/or based on a characteristic of a signal carrying the datagrams (e.g., a wavelength and/or modulation of the signal). For example, in certain embodiments, a switching element 104 may include a switch fabric (SWF). Switching element 104 may include a processor configured to interpret and/or execute program instructions and/or process data (e.g., microprocessor, microcontroller, digital signal processor (DSP), application specific integrated circuit (ASIC), or any other digital or analog circuitry configured to interpret and/or execute program instructions and/or process data). In embodiments of the present disclosure, switching element 104 may perform functionality associated with processing of multicast data in accordance with IGMP and maintenance of IGMP state (e.g., IGMP group membership) as described in greater detail herein.

As shown in FIG. 1, switching element 104 may include multicast group data 114. Multicast group data 114 may comprise a database, map, list, and/or other suitable data structure having one or more entries, each entry indicating one or more network interfaces 106 associated with a multicast group. As described below, network interfaces 106 may perform processing and maintenance associated with multicast groups. Thus, an entry in multicast group data 114 indicating that a network interface 106 is associated with a particular multicast group indicates that such network interface 106 is coupled to network elements 112 that are members of such particular multicast group, and such network interface 106 performs processing and maintenance with respect to such network elements 112.

Each network interface 106 may be communicatively coupled to switching element 104 and may include any suitable system, apparatus, or device configured to serve as an interface between network element 102 and a transmission medium 12. Each network interface 106 may enable network element 102 to communicate to other network elements 112 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

In operation, a network interface 106 may be configured to receive traffic via a port 110 and forward such traffic to switching element 104. Switching element 104 may forward such traffic to another network interface 106 and/or port 110 based on an analysis of contents of datagrams carrying the traffic and/or based on a characteristic of a signal carrying the datagrams (e.g., a wavelength or modulation of the signal). For example, in some embodiments, a network interface may include a network processing unit capable of performing network traffic processing and forwarding. Network interface 106 may include a processor configured to interpret and/or execute program instructions and/or process data (e.g., microprocessor, microcontroller, digital signal processor (DSP), application specific integrated circuit (ASIC), or any other digital or analog circuitry configured to interpret and/or execute program instructions and/or process data). In embodiments of the present disclosure, network interface may perform functionality associated with processing of multicast data in accordance with IGMP and maintenance of IGMP state (e.g., IGMP group membership) as described in greater detail herein.

In addition, each network interface 106 may be configured to perform IGMP processing and maintenance associated with network elements 112 coupled to such network interface 106 including maintenance of timers, aging out of multicast group entries, programming of new entries and receivers, and processing of Join and Leave messages from network elements 112 coupled to such network interface 106. Accordingly, each network interface may be treated as a single entity for forwarding multicast traffic to a specific multicast group. Accordingly, some IGMP processing and maintenance that is performed primarily by switching element 104 in traditional architectures may be instead be performed by network interfaces 106, as described in this disclosure. Such distributed processing may reduce processing required by a centralized switching element 104 and provides scalability to allow for handling of large numbers of packets.

As depicted in FIG. 1, each of network interfaces 106 may include one or more physical ports 110. Each physical port 110 may include any system, device or apparatus configured to serve as a physical interface between a corresponding transmission medium 12 and network interface 106. For example, a physical port 110 may comprise an Ethernet port, an optical port, or any other suitable port.

Also as shown in FIG. 1, switching element 104 may include multicast group data 116. Multicast group data 116 may comprise a database, map, list, and/or other suitable data structure having one or more entries, each entry indicating one or more network elements 112 associated with a multicast group. An entry in multicast group data 116 indicating that a network element 112 is associated with a particular multicast group indicates that such network element 112 is a member of such particular multicast group (e.g., a receiver of such multicast group).

In operation, all multicast source data streams may first be sent to the centralized switching element from all network interface ports 110. Upon receipt of a multicast stream from a multicast source, switching element 104 may, based on information set forth in multicast group data 114, send only one copy of the multicast data stream to every network interface 106 which has one or more network elements 112 coupled thereto which are members of the target multicast group of the stream. Upon receipt of a multicast data frame by a network interface 106 from switch fabric 104, the network interface 106 may, based on information set forth in multicast group data 116, replicate the frame such that network interface 106 sends one copy of the frame to each network element coupled thereto which is a member of the target multicast group of the frame.

In addition, a network interface 106 may process all IGMP control messages (e.g., Leave, Join, etc.) and forward only IGMP messages to switching element 104 associated with a first network element 112 coupled to the network interface 106 to join a multicast group (e.g., IGMP Join message) and associated with a last network element 112 coupled to the network interface to leave a multicast group (e.g., IGMP Leave message). For example, the first IGMP Join message for a multicast group received on a port 110 of a network interface 106 may be forwarded to switching element 104 so that switching element 104 may create of update multicast group data 114, thus allowing switching element 104 to direct multicast data traffic to the network interface 106. As another example, the last IGMP Leave message for a multicast group received on a port 110 of a network interface may be forwarded to switching element 104 so that it may delete or update multicast group data 114 so that switching element 104 no longer forwards multicast data traffic to the network interface 106. Switching element 104 may perform only limited IGMP processing and maintenance, including handling IGMP messages received from network interfaces 106 in order to create entries in multicast group data 114 for forwarding traffic for a multicast group to a specific network interface 106 (e.g., in response to IGMP Join message forwarded from a network interface 106) and deleting an entry related to a specific network interface 106 as a receiver for a specific multicast group (e.g., in response to an IGMP Leave message forwarded from a network interface 106). Such functionality is further detailed with respect to the discussion of FIGS. 2 and 3, below.

Network interfaces 106 may also undertake processing of other IGMP control messages. For example, if network element 102 acts as the IGMP Querier for a Virtual Local Area Network (VLAN), then the Querier functionality may be executed by a network interface 106 interfacing with network elements 112 of a multicast group. A network interface 106 may generate IGMP Group Specific Query and IGMP General Query messages and handle responses to such messages. IGMP Join and Leave messages received in response to query messages may be handled as described above. Accordingly, all network elements 112 see network element 102 as a single querier and not as individual network interfaces 106. Generated query messages may have a single IP address as the address of the querier. Such IP address may be maintained in a central location within network element 102 (e.g., within multicast group data 114) may be supplied to individual network interfaces 106 to be used in IGMP Query messages.

Similarly, if a network element 112 is acting as an IGMP Querier for an individual VLAN, then all of the IGMP Query Response messages may be handled by switching element 104. Switching element may maintain a full record of all multicast groups currently active in network 10 (e.g., in multicast group data 114) and accordingly may reply to an IGMP Query using such information.

In addition, in response to a receipt of a spanning tree protocol topology change notification (STP TCN), STP may instruct IGMP protocol to handle TCN (e.g., informs IGMP protocol at switching element 104). All STP TCN messages received on any port 110 on a network interface 106 may be forwarded to switching element 104. Switching element 104 may then forward all received STP TCN messages to all active network interfaces which have the VLAN active on them and have active receivers for multicast groups. The network interfaces 106 may in turn process such TCNs received from switching element 104 in accordance with standards of STP protocol, which may, for example, require deleting of all multicast group entries from multicast group data 116 for such VLAN.

FIG. 2 illustrates a flow chart of an example method 200 for processing of a Join message, in accordance with embodiments of the present disclosure; and. According to one embodiment, method 200 may begin at step 202. As noted above, teachings of the present disclosure may be implemented in a variety of configurations of network 10. As such, the preferred initialization point for method 200 and the order of the steps 202-210 comprising method 200 may depend on the implementation chosen.

At step 202, a network interface (e.g., a network interface 106) may receive a IGMP Join message from a receiver (e.g., network element 112) indicating that the receiver is joining a multicast group. At step 204, in response to receipt of the Join message, the network interface may determine whether the receiver is the first member of a multicast group and coupled to the network interface to join such multicast group (e.g., whether the receiver will be the only receiver of the multicast group coupled to the network interface after joining the multicast group). If the receiver is the first member of the multicast group, method 200 may proceed to step 206. Otherwise, method 200 may proceed to step 210.

At step 206, in response to a determination that the Join message was sent from a receiver which was the first to join the multicast group and coupled to the network interface, the network element may forward the Join message to the switching element (e.g., switching element 104). At step 208, update its multicast group data to include an entry associating the multicast group identified in the Join message to the network interface forwarding the Join message. For example, in response to receipt of the Join message, the switching element may examine its multicast group data (e.g., multicast group data 114) to determine if an entry already exists for the multicast group for which the Join message has been received. If an entry already exists in the multicast group data, the switching element may update its multicast group data to include the network element that forwarded the Join message, so that multicast data may be forwarded to such network interface. If no entry exists for the multicast group, the switching element may create a new entry in its multicast group data to include the network element that forwarded the Join message, so that multicast data may be forwarded to such network interface.

At step 210, the network interface may update its multicast group data to include an entry associating the multicast group identified in the Join message to the receiver sending the join message. After completion of step 210, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using network 10 or any other system operable to implement method 200. In certain embodiments, method 200 may be implemented partially or fully in software and/or firmware embodied in computer-readable media.

FIG. 3 illustrates a flow chart of an example method 300 for processing of a Leave message, in accordance with embodiments of the present disclosure. According to one embodiment, method 300 may begin at step 302. As noted above, teachings of the present disclosure may be implemented in a variety of configurations of network 10. As such, the preferred initialization point for method 300 and the order of the steps 302-310 comprising method 300 may depend on the implementation chosen.

At step 302, a network interface (e.g., a network interface 106) may receive a IGMP Leave message from a receiver (e.g., network element 112) indicating that the receiver is leaving a multicast group. At step 304, in response to receipt of the Leave message, the network interface may determine whether the receiver is the last remaining member of a multicast group and coupled to the network interface to leave such multicast group (e.g., whether the receiver is the only remaining receiver of the multicast group). If the receiver is the last member of the multicast group, method 300 may proceed to step 306. Otherwise, method 300 may proceed to step 310.

At step 306, in response to a determination that the Leave message was sent from a receiver which was the last remaining member of the multicast group and coupled to the network interface, the network element may forward the Leave message to the switching element (e.g., switching element 104). At step 308, in response to receipt of the join message, the switching element may update its multicast group data to include remove the entry associating the multicast group identified in the Leave message to the network interface forwarding the Leave message. For example, upon receipt of such a Leave message from a network interface, switching element may examine its multicast group data to determine if an entry exists for the multicast group data. If an entry exists, the switching element may update the entry to delete the network interface which forwarded the Leave message as a receiver of the multicast data, so that multicast data is no longer forwarded to the network interface. If the network interface forwarding the Leave message is the only receiver in the multicast group (e.g., as set forth in the multicast group data of the switching element), then the switching element may delete the entry as there are no other network interfaces associated with such multicast group.

At step 310, the network interface may update its multicast group data to include an entry associating the multicast group identified in the Join message to the receiver sending the join message. After completion of step 310, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using network 10 or any other system operable to implement method 300. In certain embodiments, method 300 may be implemented partially or fully in software and/or firmware embodied in computer-readable media.

Through the addition and removal of entries in their respective multicast group data, as described above, the switching element and the network interface may appropriately forward multicast traffic to members of multicast groups.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

A component of network 10 and/or a network element 102 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 and/or a network element 102 without departing from the scope of the invention. The components of network 10 and/or network element 102 may be integrated or separated. Moreover, the operations of network 10 and/or network element 102 may be performed by more, fewer, or other components. Additionally, operations of network 10 and/or a network element 102 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A network element, comprising:
   a switching element; and
   one or more network interfaces communicatively coupled to the switching element, each particular network interface of the one or more network interfaces configured to:
      receive an Internet Group Management Protocol (IGMF) message from a second network element communicatively coupled to the particular network interface, the IGMP message associated with one multicast group of a plurality of multicast groups, each of the plurality of multicast groups having one or more members;
      update first multicast group data stored at the particular network interface based on the received IGMP message, the first multicast group data including one or more entries, each entry setting forth a multicast group of the plurality of multicast groups and the one or more members of the multicast group;
      determine whether the second network element is the sole member of the multicast group associated with the received IGMP message based on the received IGMP message and the first muiticast group data; and forward the received IGMP message to the switching element only upon determining that the second network element is the sole member of the multicast group associated with the received IGMP message, wherein the switching element is configured to:
  in response to receipt of the IGMP message forwarded from one of the one or more network interfaces, update second multicast group data associated with the switching element, the second multicast group data including one or more entries, each entry setting forth a multicast group of the plurality of multicast groups and one or more of the one or more network interfaces which are communicatively coupled to members of the multicast group of the entry; and
  in response to receipt of a spanning tree protocol topology change notification (TCN), forward, based on the second multicast group data, the TCN to one or more of the network interfaces that are (i) coupled to network elements affected by the TCN and (ii) configured to process the TCN message.

2. The network element according to claim 1, wherein:
the received IGMP message is a join message; and
determining whether the second network element is the sole member of the multicast group associated with the received IGMP message based on the received IGMP message and the first multicast group data comprises determining whether the second network element is the first member of the multicast group.

3. The network element according to claim 1, wherein:
the received IGMP message is a leave message; and
determining whether the second network element is the sole member of the multicast group associated with the received IGMP message based on the received IGMP message and the first multicast group data comprises determining whether the second network element is the last member of the multicast group.

4. The network element according to claim 1, the switching element configured to forward multicast traffic frames to the one or more network interfaces based on the second multicast group data.

5. The network element according to claim 1, the particular network interface configured to forward multicast traffic frames to one or more other network elements based on the first multicast group data.

6. The network element according to claim 1, the particular network interface configured to:
generate IGMP Group Specific Query and IGMP General Query messages; and
process responses to IGMP Group Specific Query and IGMP General Query messages.

7. The network element according to claim 1, the switching element configured to reply to an IGMP Query received by the network element.

8. A method, comprising:
receiving, at a network interface of a first network element, an Internet Group Management Protocol (IGMP) message from a second network element communicatively coupled to the network interface, the IGMP message associated with one multicast group of a plurality of multicast groups, each of the plurality of multicast groups having one or more members;

updating first multicast group data stored at the network interface based on the received IGMP message, the first multicast group data including one or more entries, each entry setting forth a multicast group of the plurality of multicast groups and the one or more members of the multicast group;
determining whether the second network element is the sole member of the muiticast group associated with the received IGMP message based on the received IGMP message and the first multicast group data;
forwarding the received IGMP message to a switching element of the first network element only upon determining that the second network element is the sole member of the multicast group associated with the received IGMP message, the switching element communicatively coupled to the network interface;
updating second multicast group data associated with the switching element in response to receipt of the IGMP message forwarded from one of the one or more network interfaces, the second multicast group data including one or more entries, each entry setting forth a multicast group of the plurality of multicast groups and one or more of the one or more network interfaces which are communicatively coupled to members of the multicast group of the entry; and
in response to receipt of a spanning tree protocol topology change notification (TCN), forwarding, by the switching element and based on the second multicast group data, the TCN to one or more of the network interfaces that are (i) coupled to network elements affected by the TCN and (ii) configured to process the TCN message.

9. The method according to claim 8, wherein:
the received IGMP message is a join message; and
determining whether the second network element is the sole member of the multicast group associated with the received IGMP message based on the received IGMP message and the first multicast group data comprises determining whether the second network element is the first member of the multicast group.

10. The method according to claim 8, wherein:
the received IGMP message is a leave message; and
determining whether the second network element is the sole member of the multicast group associated with the received IGMP message based on the received IGMP message and the first multicast group data comprises determining whether the second network element is the last member of the multicast group.

11. The method according to claim 8, further comprising forwarding multicast traffic frames by the switching element to the one or more network interfaces based on the second multicast group data.

12. The method according to claim 8, further comprising forwarding multicast traffic frames by the network interface to one or more other network elements based on the first multicast group data.

13. The method according to claim 8, further comprising:
generating, by the network interface, IGMP Group Specific Query and IGMP General Query messages; and
processing, by the network interface, responses to IGMP Group Specific Query and IGMP General Query messages.

14. The method according to claim 8, further comprising replying, by the switching element, to an IGMP Query received by the network element.

* * * * *